(12) United States Patent
Simon (10) Patent No.: US 8,061,883 B2
(45) Date of Patent: Nov. 22, 2011

(54) ILLUMINATING DEVICES USING SMALL PT SOURCES INCLUDING LEDS

(76) Inventor: Jerome H. Simon, Newton Centre, MA (US)

( * ) Notice: Subject to any disclaimer, the term of this patent is extended or adjusted under 35 U.S.C. 154(b) by 0 days.

(21) Appl. No.: 12/467,798

(22) Filed: May 18, 2009

(65) Prior Publication Data

US 2009/0323356 A1    Dec. 31, 2009

Related U.S. Application Data

(63) Continuation of application No. 10/758,929, filed on Jan. 16, 2004, now Pat. No. 7,534,013.

(60) Provisional application No. 60/440,495, filed on Jan. 16, 2003.

(51) Int. Cl.
*F21V 7/04*      (2006.01)

(52) U.S. Cl. ........................................ 362/628; 362/330

(58) Field of Classification Search ................ 362/330, 362/311.02, 608, 615, 616, 621, 622, 628
See application file for complete search history.

(56) References Cited

U.S. PATENT DOCUMENTS

| | | | | |
|---|---|---|---|---|
| 3,040,168 A * | 6/1962 | Stearns | .......................... | 362/628 |
| 6,152,569 A * | 11/2000 | Aizawa | .......................... | 362/628 |
| 6,193,383 B1 * | 2/2001 | Onikiri et al. | .................. | 362/615 |
| 6,379,017 B2 * | 4/2002 | Nakabayashi et al. | ......... | 362/620 |
| 6,527,411 B1 * | 3/2003 | Sayers | .......................... | 362/628 |
| 2004/0076010 A1 * | 4/2004 | Kuo | ............................... | 362/330 |

* cited by examiner

*Primary Examiner* — Y My Quach Lee
(74) *Attorney, Agent, or Firm* — Burns & Levinson LLP; Jerry Cohen; Harvey Kaye (57) ABSTRACT

In one form, there is a luminaire for providing uniform color and brightness from multiple small light sources, which includes a shallow plate of transparent material having a first surface which is substantially flat, and a second surface which includes patterned planes acutely disposed to the first surface. Each second surface is adjacent to an entry face into which light from the multiple small light sources is projected into the plane.

17 Claims, 13 Drawing Sheets

ILLUMINATING DEVICES USING SMALL PT SOURCES INCLUDING LEDS

REFERENCE TO RELATED APPLICATIONS

The present application is based on and claims the priority of provisional application, Ser. No. 60/440,495 filed Jan. 16, 2003 as well as the priority of parent utility application, Ser. No. 10/758,929 filed Jan. 16, 2004. The substance of both applications are hereby incorporated herein by reference.

FIELD OF INVENTION

The present invention relates generally to the lighting field, and, more particularly to creating planar illumination devices from which diffused light of signular or multicolored light can be derived.

SUMMARY OF INVENTION

The present invention provides planar illumination devices from which diffused light of singular or multicolored light can be derived.

It is another object of this invention to provide directionally controllable light that is projected from bendable planar illumination devices in order to change patterns of illumination.

It is another object of the invention that with the integration and introduction of electric control devices, the above-mentioned planar surfaces can be made to change/blend and create patterns of changing color.

It is another object of this invention to create planar illumination devices that project light onto architectural surfaces with controlled and varied beams, angles and light patterns.

It is another object of this invention to create linear illumination devices in the shape of bars, strips and rods of varied cross-sections that emit light along their lengths in evenly distributed or patterned illumination.

It is another object of the invention to create geometrically shaped illumination devices for decorative and general lighting products.

These and other objects, features and advantages will be apparent from the following detailed description of preferred embodiments taken in conjunction with the accompanying drawings in which:

BRIEF DESCRIPTIONS OF FIGURES

FIG. 2B is a diagrammatic view which shows a variation of FIG. 2A.

DETAILED DESCRIPTION OF THE DRAWINGS

Figure 1:
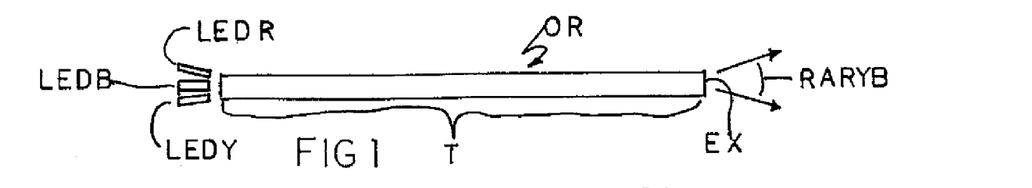
FIG. 1 is a diagrammatic view illustrating a light transmission rod blending color from multiple LEDs.

FIG. 1 illustrates a means for mixing and blending light from multiple light sources producing different wavelengths of light. The means shown in FIG. 1 is comprised of three light projecting LEDs, LED R, LED Y, and LED B projecting red, yellow, and blue light respectively. LED R, LED Y and LED B are arranged to project light into the entry face of the optical transmission rod OR. Light from each LED traveling through OR is multiply reflected by total internal reflections (T.I.R) and exits through exit face EX as blended light RARYB. Any or all of the LEDs, LED R, LED Y or LED B can be illuminated at any one time and at any ratio of brightness to blend colors of various hues and brightnesses. The same is true for all FIGS having multiple LEDs of varied colors. For graphic and descriptive purposes three LEDs have been shown.

Figure 1A:
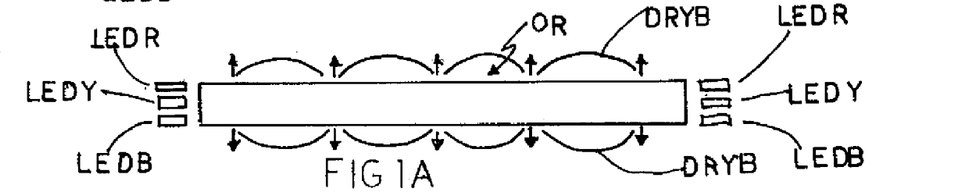
FIG. 1A is a diagrammatic view illustrating a variation of FIG. 1 in which the surface of OR is textured.

FIG. 1A illustrates a similar optical configuration as FIG. 1, differing in that the surface of OR is textured, causing the light from LED, LED Y and LED B to be diffused along the pathway of and from the surface of the transmission tube or rod OR.

Figure 2:
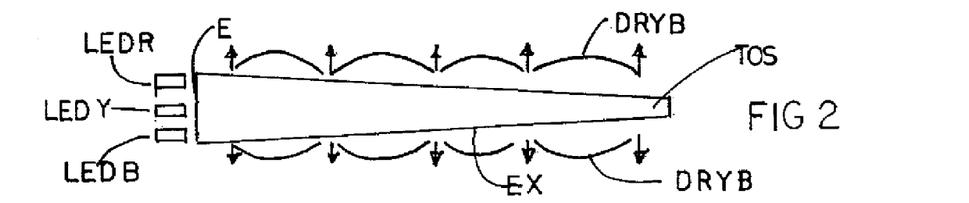
FIG. 2 is a diagrammatic view which illustrates a means for blending color from multiple LEDs.

FIG. 2 illustrates a means for mixing and blending light by projecting light from multiple colored LEDs, LED R, LED Y and LED B, into the entry face of a tapered optical structure TOS—the type and composition of such structures are described in my U.S. Pat. Nos. 5,046,805 and 6,540,382, the substance of which is incorporated herein by reference. TOS of FIG. 2 is comprised of elements causing red, yellow and blue light to be blended by TIR and are refracted through exit faces EX as blended as rays PRYB.

Rays PR may be refracted in scattered or directed patterns. Tapered optical structures provide a means from distributing relatively even brightness along their length. In this and other configurations multiple or single LEDs projecting light into an optical device for transmission or diffusion may be of singular or multiple colors.

Figure 2A:
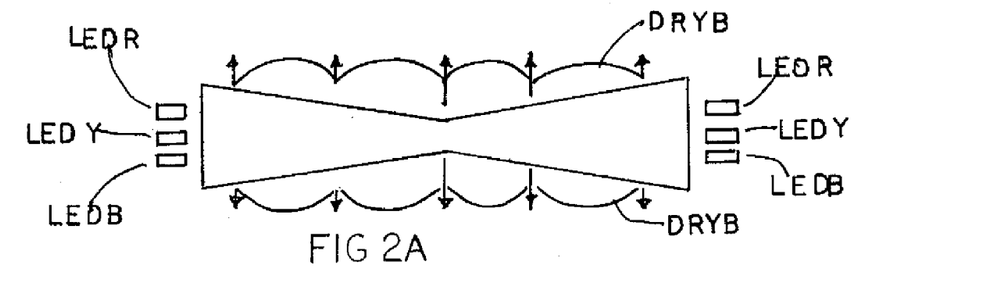
FIG. 2A is a diagrammatic view which illustrates a variation of FIG. 2.

FIG. 2A illustrates a means for blending light that is similar in structure and function to The means illustrated in FIG. 2 differing in that FIG. 2A is comprised of two sections S1 and SL which expands the length of even light distribution.

Figure 2B:
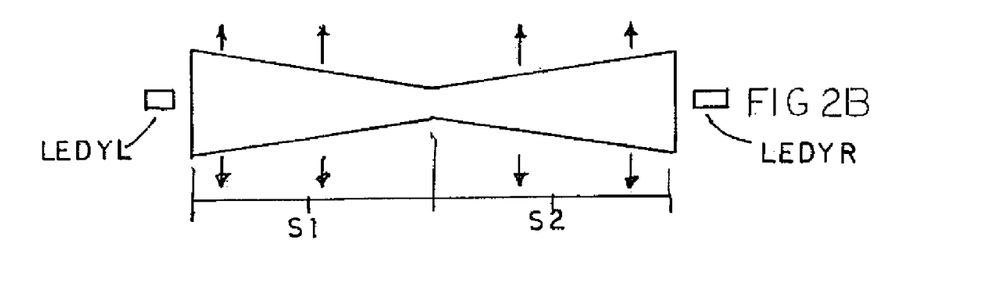

FIG. 2B is a graphic representation of an optical structure similar to that shown in FIG. 2A having a single LED at each end LED YL and LED YR. In this configuration, LED YL and LED YR may be of similar or different colors.

Figure 2C:
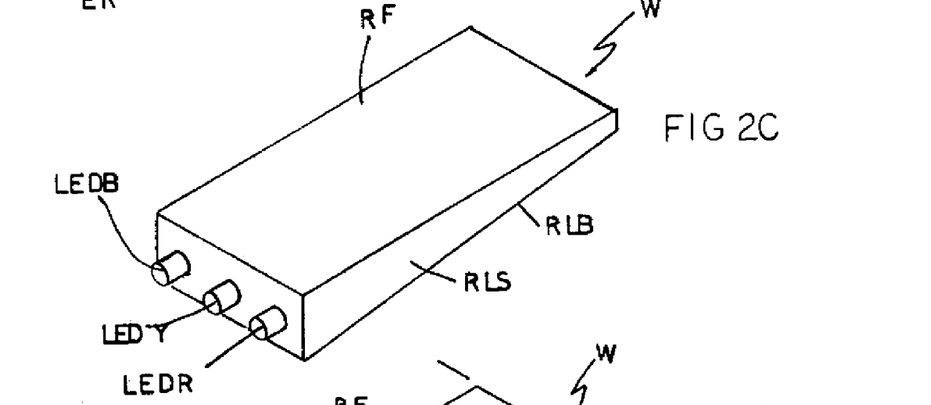
FIG. 2C is a three dimension diagram of a wedge shaped optical device for blending color from multiple LEDs.

FIG. 2C is a three-dimensional view of a solid or a hollow wedge shaped optical transmission and diffusion device W similar to that shown in FIG. 2 although one tapered surface RPL is intentionally reflective while the opposite surface is a prismatic diffuser RF. LEDs LED R, LED Y, LED B project light into the entry face EF of W. Light exits RF as a mix of light from LED R, LED Y and LED B. The sides of W are also intentionally reflective.

Figures 2D, 2E:
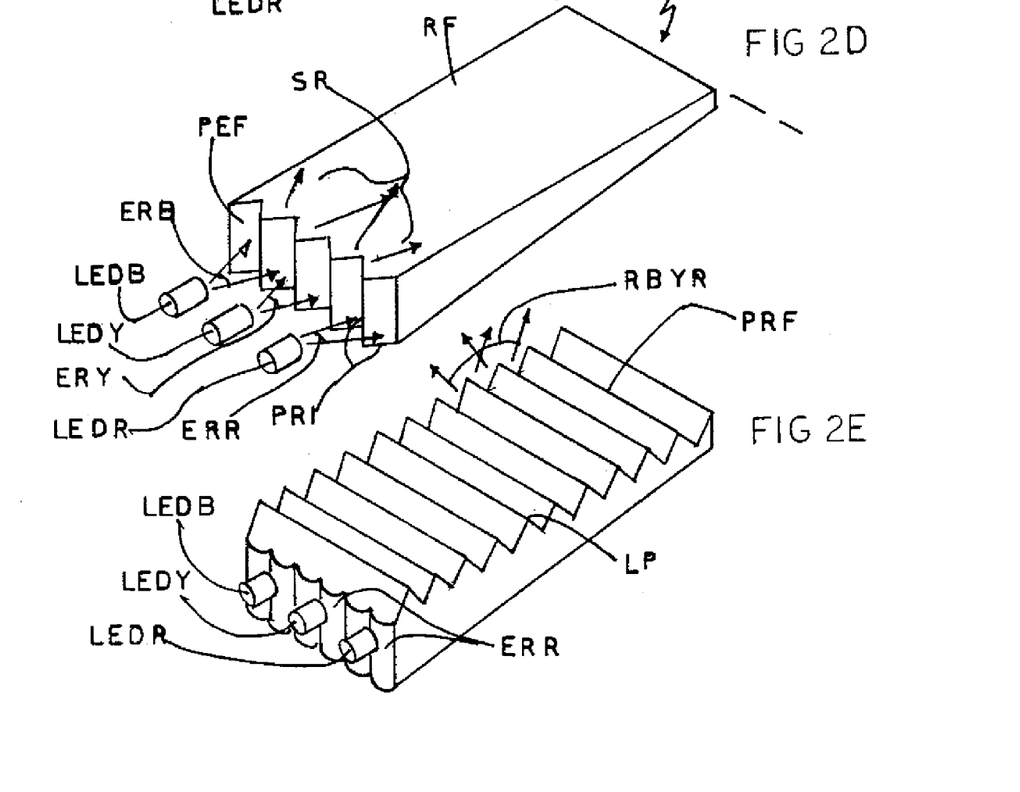
FIG. 2D shows a variation of FIG. 2C.
FIG. 2E shows a variation of FIGS. 2C and 2D.

FIG. 2D is a three-dimensional view of a solid or hollow wedge similar to that shown in FIG. 2C with the addition of a prismatic entry face PEF comprised of prisms PRI substantially perpendicular to RF. PRI scatter rays ERB, ERY and ERR from LED B, LED Y and LED R (respectively) along the planar axis PX of W facilitating the blending of light within the wedge. PRI can be replaced with positive or negative cylindrical lenses.

FIG. 2E is a three-dimensional view of a solid or hollow wedge similar to that shown in FIGS. 2C and 2D with the addition of a refractive surface PRF. PRF has linear prisms LP which result in mixed rays RBYR. PRI of FIG. 2D has been replaced by negative cylindrical surface ERR.

Figure 2F:
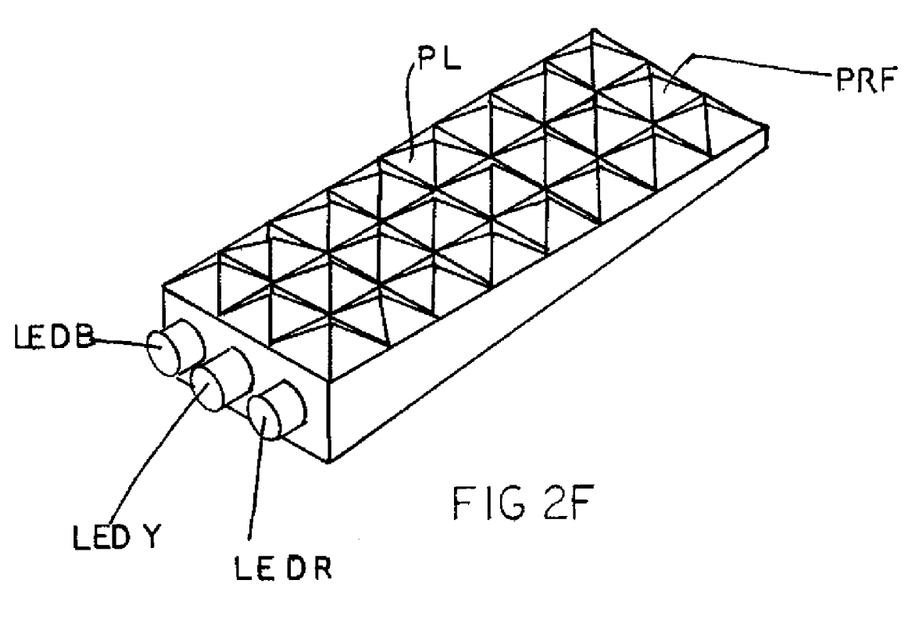
FIG. 2F shows a variation of FIGS. 2C, 2D, 2E and 2F.

FIG. 2F is a three-dimensional view of a solid or hollow wedge similar to that shown in FIGS. 2C, 2D and 2E with the addition of having a prismatic surface PRF containing pyramidal prisms PC.

Figure 2G:
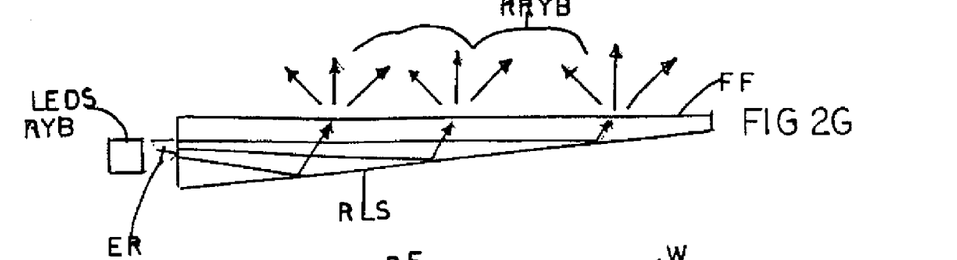
FIG. 2G shows a section view of FIGS. 2C, 2D, 2D, 2E and 2F

FIG. 2G is a sectional view of FIGS. 2C, 2D, 2E and 2F illustrating entry ray ER passing through EF, reflecting off RLS and refracted by FF as ray RRYB.

Figure 1B:
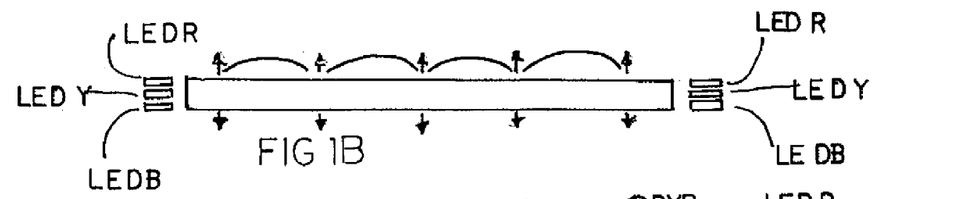
FIG. 1B is a diagrammatic view.
Figure 3:
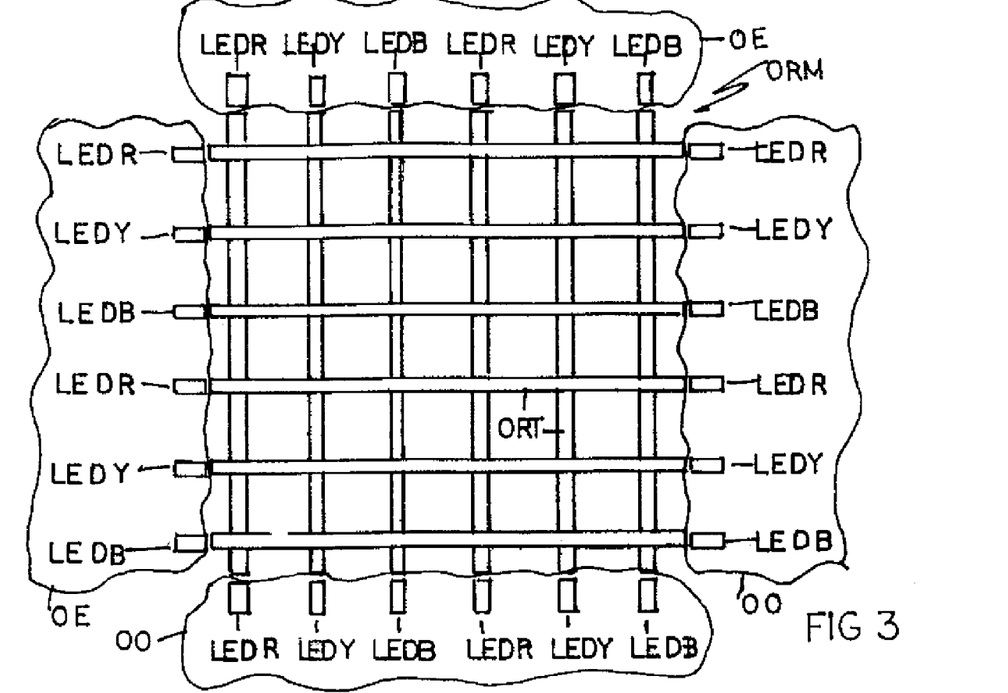
FIG. 3 illustrates a matrix of light blending rods.

FIG. 3 illustrates a matrix or grid ORM comprised of multiple rods or tubes described in FIGS. 1, 1A and 1B. Each of the tubes or rods ORT can be optically "fed" by either an LED(s) at on end only illustrated by the group of LEDs OE or from both ends by groups OE and OO.

Figure 4:
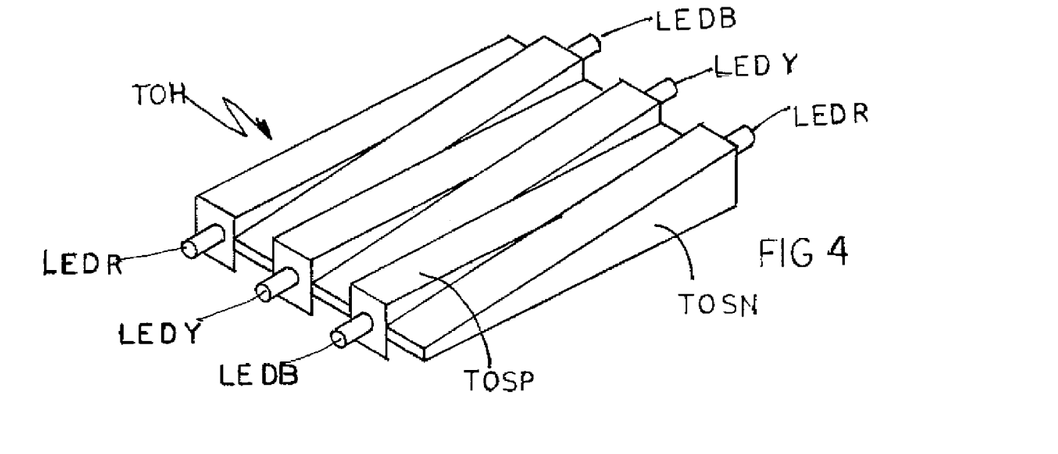
FIG. 4 is a three-dimensional view of an optical structure comprised of tapered bars.

FIG. 4 is a three-dimensional view of an optical structure TOM comprised of tapered bars TOSN and TOSP (similar to those described in FIG. 2) that are alternately configured along the structure in terms of the direction of their taper. Such a structure (TOM) may be molded from a single glass or plastic structure, in which case light between the bars would be able to pass from one bar to another where the bars are interfaced, or TOM be fabricated by stacked individual bars TOSN and TOSP in which there would be no transfer of light between the faces of the bars. Although FIG. 4 shows a single LED of the bars, multiple LEDs can be used, also shown in FIG. 2.

Figure 5:
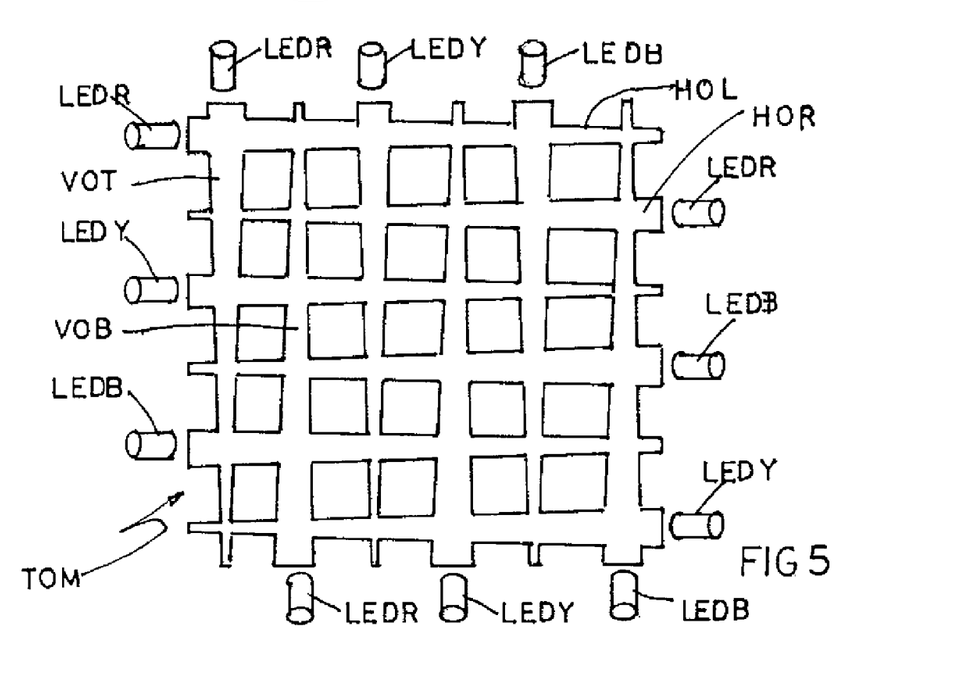
FIG. 5 is a graphic illustration of a matrix of tapered rods or bars.

FIG. 5 is a graphic illustration of a matrix or grid TOM comprised of horizontally tapered rods or bars HOL and HOR and vertically oriented tapered optical rods or bars VOT and VOB. HOL and HOR are alternately configured on the grid in terms of their direction of taper pointing left and right. Similarly, VOT and VOB are alternately configured on the grid, their direction of taper pointing up and down. LEDs, LED R, Y and B are located at the wide end (entry face) of each taper. Although a single LED is shown for each taper, as described before, multiple LEDs of the same or similar colors can be used.

Figure 6:
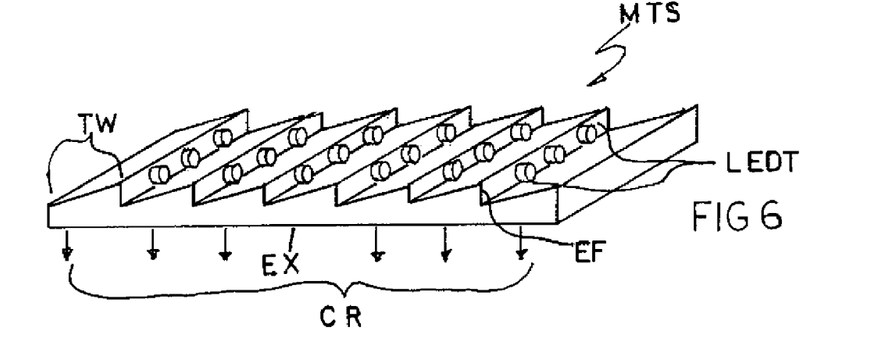
FIG. 6 is a three-dimensional illustration of an optical configuration for creating uniformly illuminated surfaces.

FIG. 6 is a three-dimensional illustration of an optical configuration MTS for creating a uniformly illuminated surface EX by projecting illumination from banks of LEDs LED T into entry faces EF through tapered wedges TW. Wedges TW function as described in FIGS. 2, 2A, and 2B. Blended light from exist exit face EX as rays CR. EX may be textured or grooved in various ways depending upon the degree of diffusion or directionality of CR that is required. Further detail of the relationship of EX to CR is described in FIGS. 2C, 2D, 2E, 2F and 2G. LED S of LED T can be of multiple colors, in which case by manipulating the brightness of individual LEDs the color emanating from EX can be multiple or a single color. LEDs of LED T may also be of a single color.

Figure 6A:
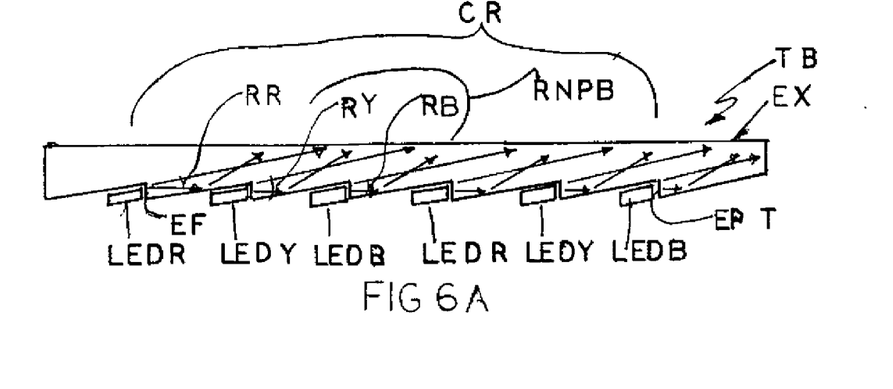
FIG. 6A is a cross-section view of FIG. 6.

FIG. 6A is a cross-section view of FIG. 6 further illustrating a bar TB of tapered optical segments having entry faces EFT through which the light from various color LEDs are projected. LED R projects rays red rays RR, LED Y projects yellow rays RY and LED B projects blue rays BR. RR, RY and RB are projected through TB and exit EX as combined or mixed color RNPB.

Figure 6B:
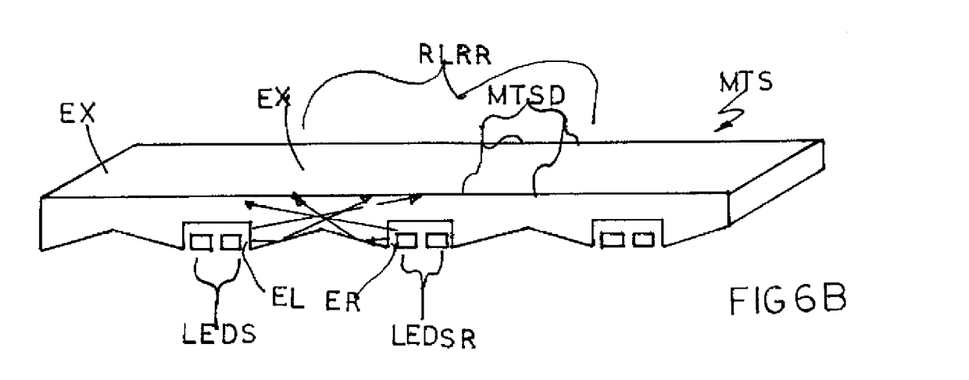
FIG. 6B is a three-dimensional diagram of an optical system for integrating the illumination from multiple LEDs.

FIG. 6B is a three dimensional diagram of an optical system MTS for integrating the illumination of multiple LEDs using the combined principles of FIGS. 6, 6A, 2A and 2B. For graphic purposes, two double rows of LEDs are illustrated: LEDSL and LEDSR of which LED L and LED R are shown to project light into entry faces EL and SR respectively and leaving the portion MTSD of entry face EX as rays RLRR which are the mixed light from LED SL and LED SR.

Figure 6C:
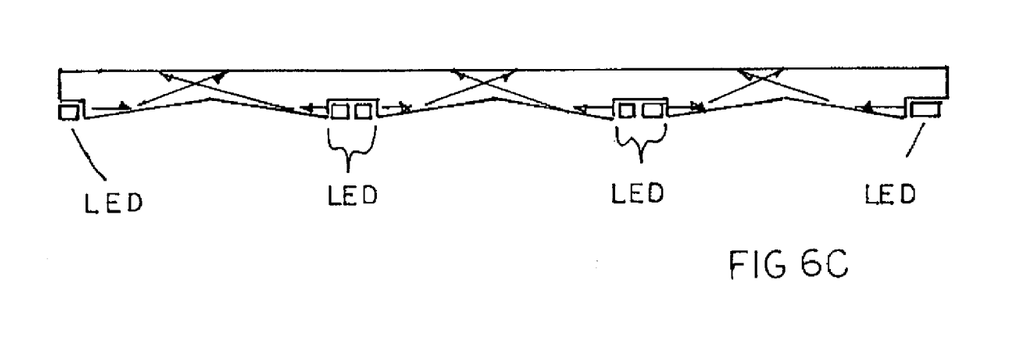
FIG. 6C is a sectional view of FIG. 6B.

FIG. 6C—is a sectional view of 6B.

Figures 7, 7A, 7B:
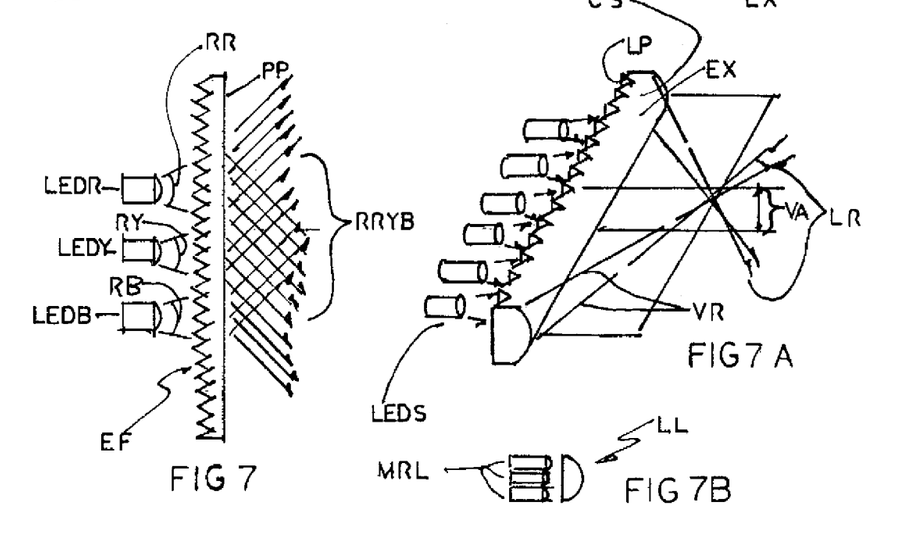
FIG. 7 is a graphic diagram illustrating a group of LEDs projecting rays though a prismatic plate.
FIG. 7A is a three-dimensional diagram of a row of LEDs and cylindrical lenses.
FIG. 7B is a cross-section view of FIG. 7A.

FIG. 7 is a graphic diagram illustrating a group of LEDs, LED R, LED Y and LED B projecting rays though a prismatic plate PP (containing an entry face EX comprised of either linear prisms) which divides and alters the direction of projected rays RR, RY and RB which exit PP through exit face EF as combined rays ray B.

FIG. 7A is a three-dimensional diagram of a row of LEDs projecting into a lens LL comprised of an entry face EF having linear prisms LP or positive vertical cylinder lenses at substantially 90 degrees to the focusing aspheric or spherical surface CS of the exit face EX. Rays from LEDs CR are combined and widened along the linear axis VA. This is further illustrated by rays LR crossing at a wide angle LA and rays VR crossing at a narrow angle VA. This process allows for a narrow band of mixed color illumination from a linear projection device.

FIG. 7B is a cross-sectional view of FIG. 7A showing multiple rows of LEDs MRL projecting through LL.

Figure 8:
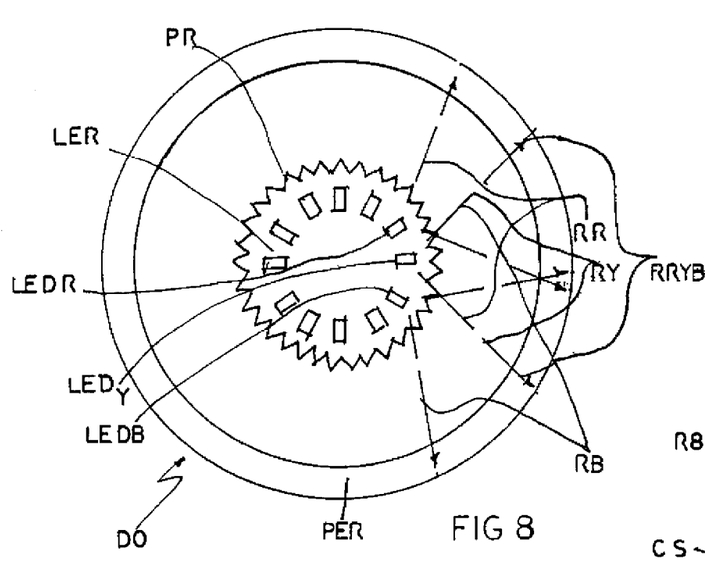
FIG. 8 is a plan view of a disk like optical configuration.

FIG. 8 is a plane-view of a disk-like optical configuration DO having a ring of LEDs LER of alternating colors, typically LED R, LED Y and LED B, projecting into and through a refracting prismatic ring comprised of linear prisms that are oriented perpendicular to the disks' surface and onto the refractive ring RER. Rays from LED R LED Y and LED B, respectively RR, RY and RB, are mixed by PR and are reflected by RER as rays RRYB.

Figure 8A:
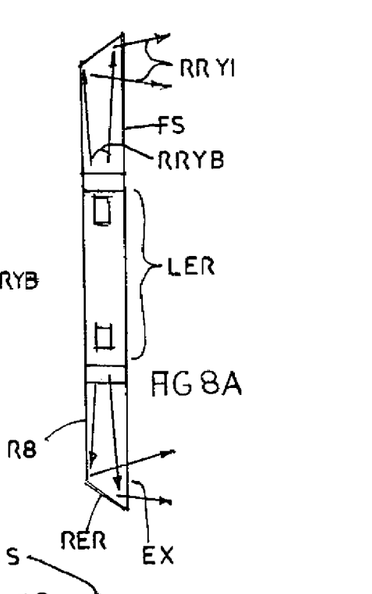
FIG. 8A is a cross-section view of FIG. 8.

FIG. 8A is a cross-sectional view of DO further illustrating the function of the combined elements LER, PR and RER. In some of the configurations PR is the entry face of a solid transparent material and RER reflects via T.I.R (total internal reflection). In this configuration, the faces of the above-mentioned ring are polished surfaces RS and FS which contain the dispersion RRYB by T.I.R., and allows RRYB to exit through area EX. In other configurations PR is a prismatic ring and RER is a separate reflector. In order to maintain a thin cross-section of DO, when PR and RER are separate elements, RS and FS can be reflective to contain the spread of RRYB.

Figure 8B:
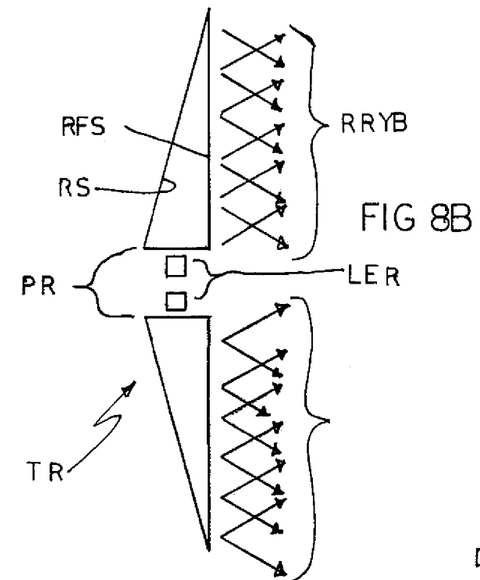
FIG. 8B is a variation of FIG. 8.

FIG. 8B is a cross-sectional view of a disk-like optical configuration having a ring of LEDs LER surrounded by a prismatic ring (as in FIG. 8) surrounded by disk TR having a tapered cross-section one face RS being reflective and one face RFS being refractive. The function of TR is similar to that described in FIGS. 6A and 6B producing mixed and diffused light RRYB.

Figure 8C:
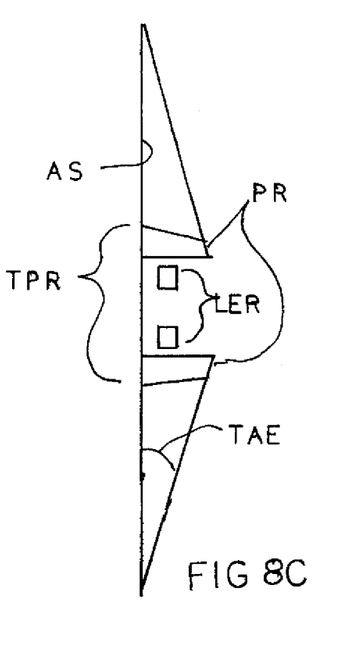
FIG. 8C is a variation of FIG. 8.

FIG. 8C is a cross-sectional view of ring of LEDs LER surrounded by a refractive ring PR (the function of both previously described) further surrounded by a ring refracted TPR. Having wedge prism cross-section TAE wide part of the wedge mounted on or within proximity to an architectural surface as light leaving PR is bent and onto AS by TPR forming a ring of light on AS.

Figure 8D:
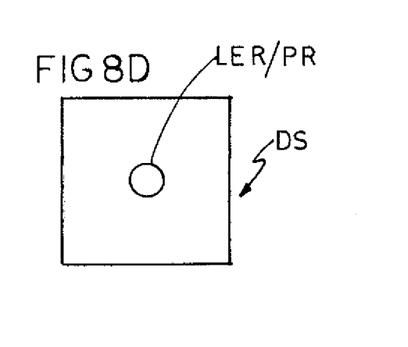
FIG. 8D is a diagrammatic view of an optical system.

FIG. 8D is a graphic representation of an optical system comprised of PR and LER within square plate PS rather than a round disk shown in FIGS. 8, 8A and 8B.

Figure 8E:
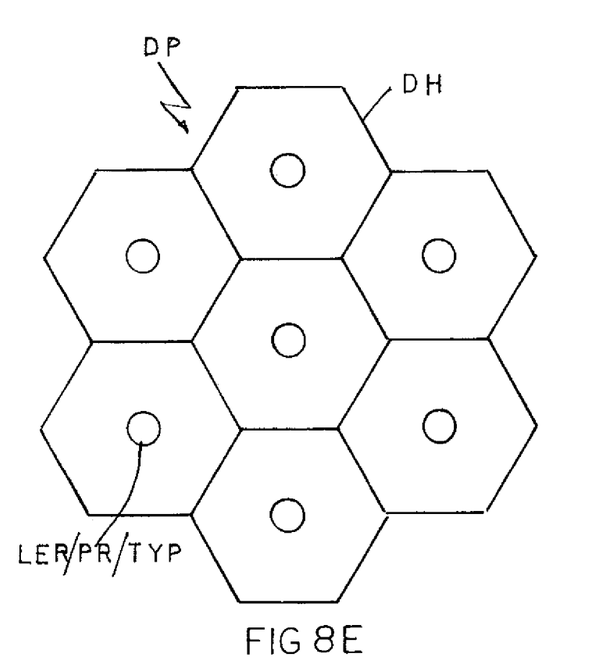
FIG. 8E is a diagrammatic view showing hexagonal disks.

FIG. 8E is a graphic illustration of a series of hexagonal shapes each comprised of an optical system LER/PR/TYP (similar to that describing FIGS. 8 and 8A) into hexagonal disks. and interlocked within a grid DP. Any geometric shapes such as triangles, squares, hexagons, etc can be used to form such a grid.

Figure 9:
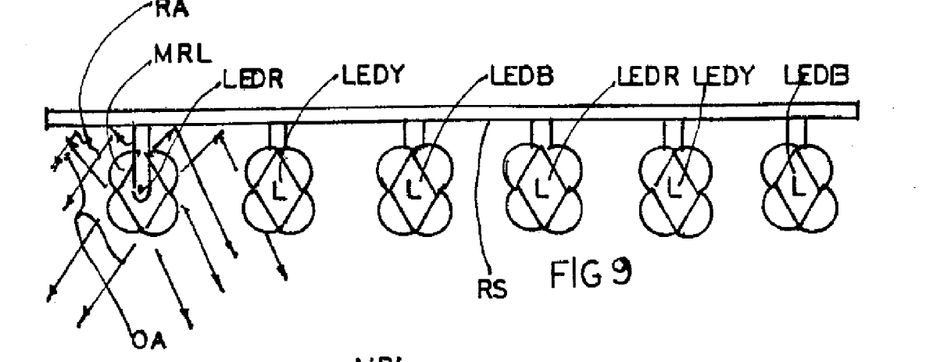
FIG. 9 is a cross-section view of an optical grid.

FIG. 9 is a cross-sectional view of a grid (FIG. 9C) of point sources surrounded by lens configurations MRL which are similar to the lens configuration shown in FIG. 2 of my U.S. Pat. No. 6,361,191, the substance of which is incorporated herein by reference. Lenses MRL are mounted to a reflective surface RS.

Figure 9A:
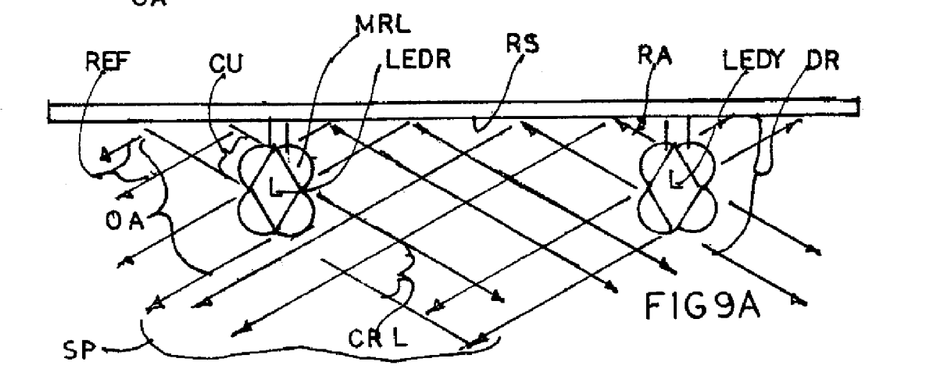
FIG. 9A is an enlarged view of a portion of FIG. 9.

FIG. 9A is an enlarged view of FIG. 9 showing MRL as being integrated with LED point sources LED R and LED Y. Light emitted by LED R or LED Y is projected as canted radial beam CRU from ring lens segment MRLU onto reflected surface RS at acute angle RA and further reflected by RS as rays REF. Ring segment MRLL projects canted radial beam CRL at angle DR REF and CRL of LED R mix with the same beams projected by LED Y and LED B forming a uniform field UF of projected light.

Figure 9B:
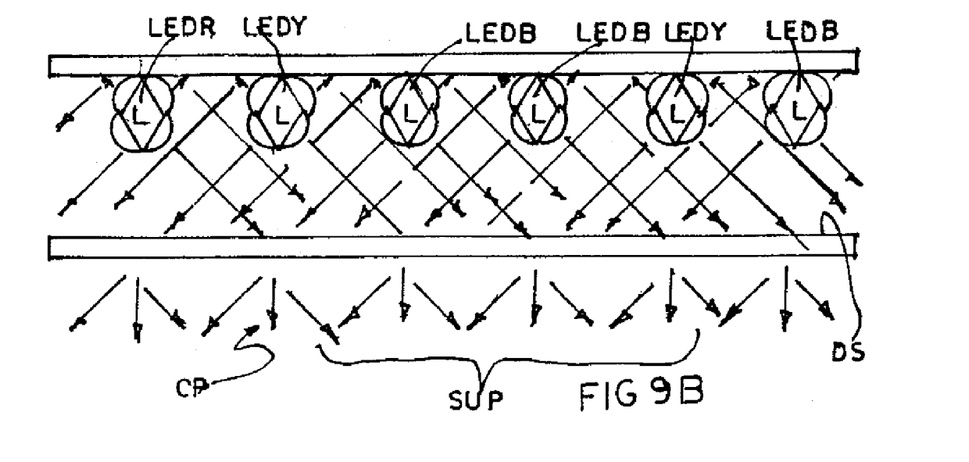
FIG. 9B is an optical light emitting source similar to that of FIG. 9.

FIG. 9B is an optical light emitting structure CI similar to that described in FIGS. 9 and 9A with the addition of diffusing surface DS which receives CRU and CRL further mixing and directing UF as SUP. The optical configuration of CP can provide a uniformly illuminated panel, and when the brightness of LED R, LED y and LED B are controlled independently by an electrical means, the color and hue of SUP can be changeable and variable. The combination of MRL, RS, DS as an individual illustration means is disclosed in FIG. 3 and the accompanying text of my U.S. Pat. No. 6,033,092, the substance of which is incorporated herein by reference.

Figure 9C:
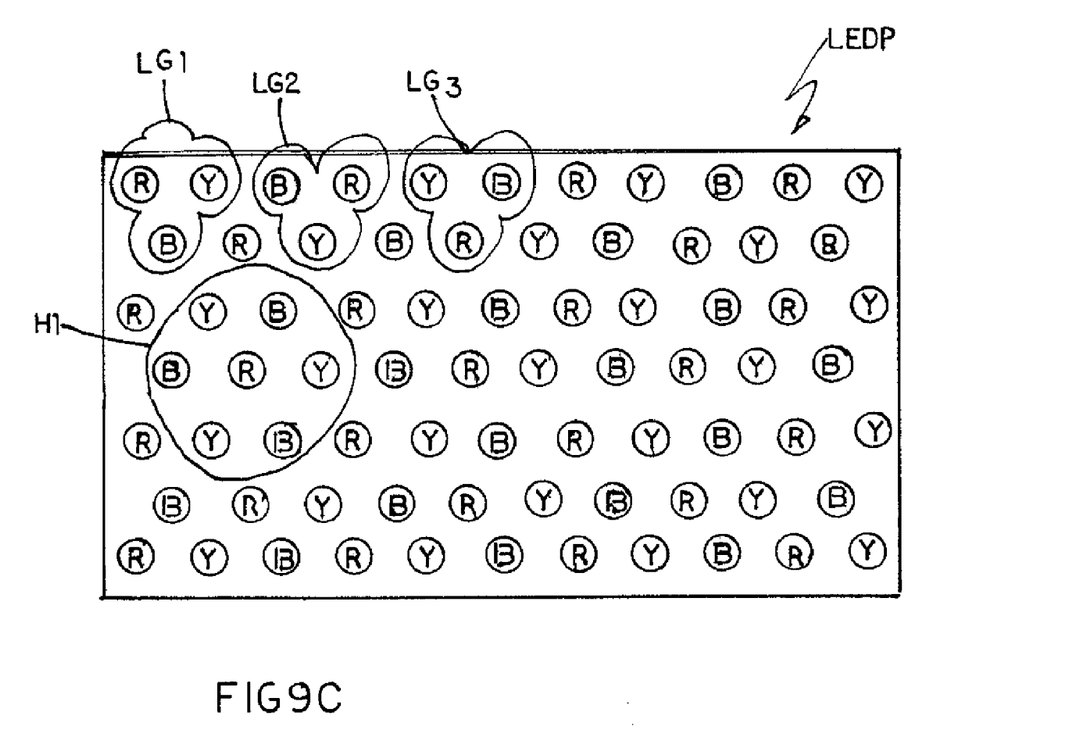
FIG. 9C is a graphic representation of a plan view of FIGS. 9, 9A, and 9B.

FIG. 9C is a graphic representation of a plan view of FIGS. 9, 9A and 9B illustrating a geometric pattern of LEDs R,Y and B mounted within a panel LEDP. The pattern consists of substantially equilateral groupings of LEDs, which in the case of using three colors of LEDS (for instance red, yellow and blue) each color is surrounded by the other two colors alternately forming a hexagon H-1.

Figure 10:
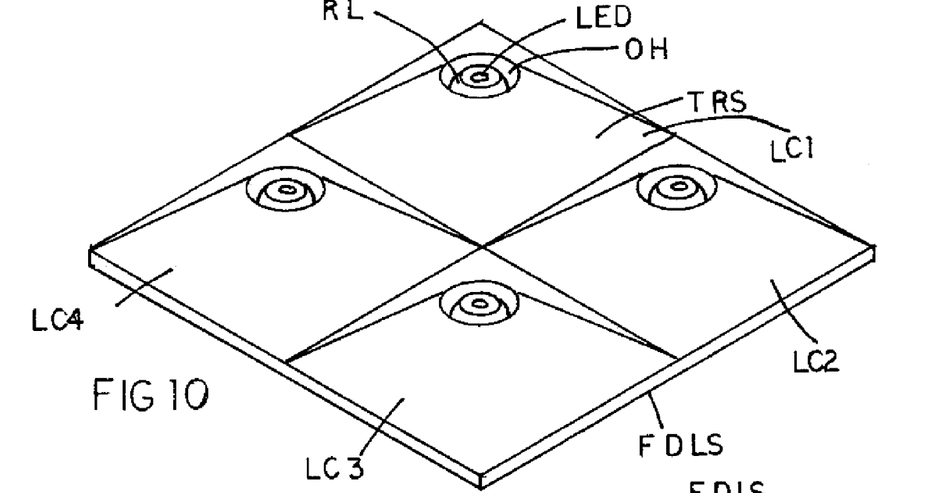
FIG. 10 is a three dimensional diagram of an optical guide.

FIG. 10 is a three-dimensional diagram of a grid IG comprised of similar panel-type sections LC, LC2, LC3 and LC4. LC1 is a typical panel having a pyramidal reflective surface TRS in which a blind hole OH is at the apex of the pyramid. Within OH is an LED (surrounded by a ring collimated lens RL). A refractive surface FDLS is opposite to this and is substantially similar in function and design as described in RF of FIGS. 2A, 2B, 2C, 2D, 2E, 2G and EX of FIGS. 6, 6A and 6B.

Figure 10A:
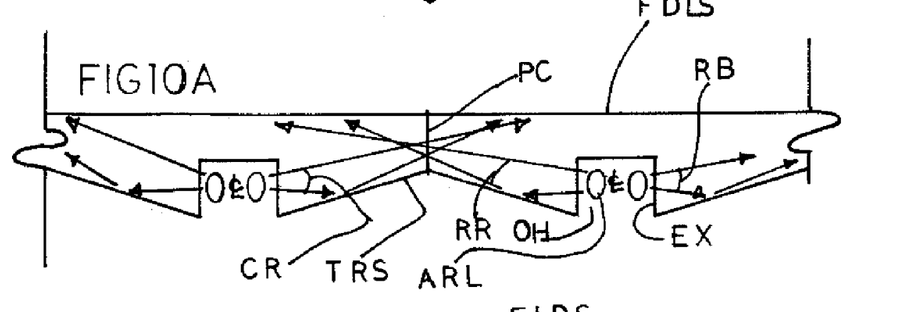
FIG. 10A is a partial cross-section view of FIG. 10.

FIG. 10A is a diagram representing a partial cross-section of 2 LC panels of FIG. 10. LED 1 is surrounded by ring collimation lens ARL which projects a radial beam RB through entry face EX of hole OH. RB is reflected by TRS as rays RR onto FDLS. PC is the dividing face which borders panels LC. PC is a window when LC is a single mold, or partially reflective when LC is a separate component.

Figure 10B:
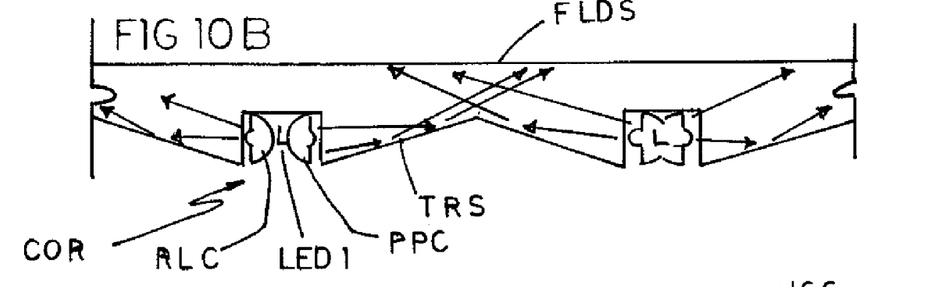
FIG. 10B illustrates a modification of 10A

FIG. 10B is a diagram differing from that of 10A in that ARL of FIG. 10A has been replaced by collimating ring COR (which can be the enclosure for light source LED 1). COR is comprised of a LED 1 surrounded by a collimating ring section RLC and a parabolic reflecting section PPC. COR is further described in my U.S. Pat. No. 5,897,201 the substance of which is incorporated herein by reference.

Figure 10C:
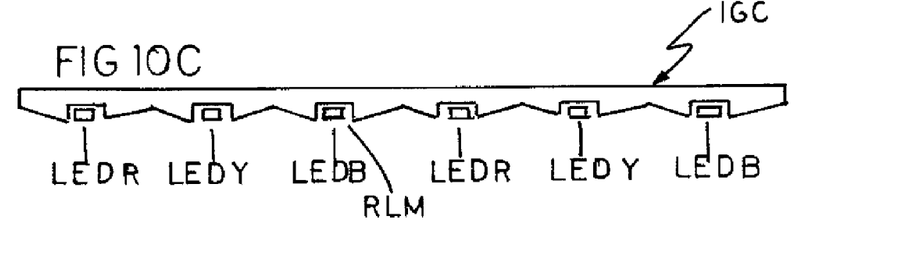
FIG. 10C is a cross-section view of FIG. 10, 10A and 10B.

FIG. 10C is a cross-section of a grid as illustrated in FIGS. 10, 10A and 10B having a sequential repeating colors LEDs. IG of FIG. 19 may be comprised of triangular panels about a triangulated grid shown in FIG. 9C or other polyhedinal shapes such as hexagons shown in FIG. 8E.

Figure 11:
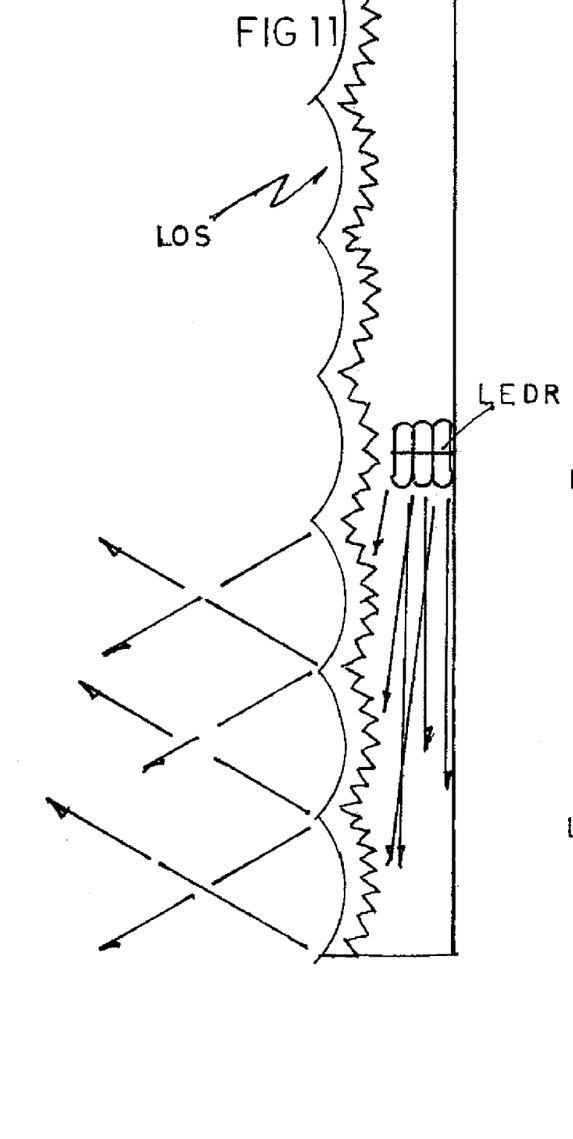
FIG. 11 is a cross-section diagram of a light emitting optical structure.

FIG. 11 is a cross-sectional diagram of a light-emitting optical structure containing a light source LED R. LED R is comprised of multiple LEDs bundled in a tube or rod configuration. The function of LOS is described as an alternate to the light source and collimation means, and is described in my U.S. Pat. No. 6,540,382, the substance of which is incorporated herein by reference.

Figure 11A:
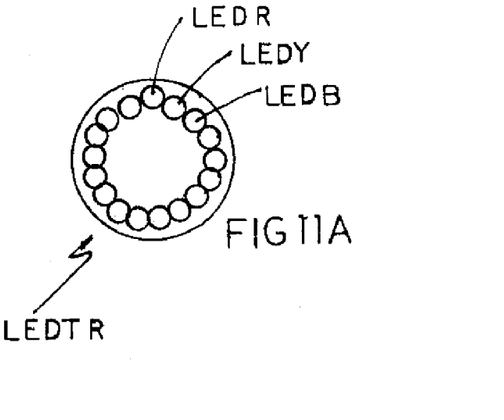
FIG. 11A is a cross-section diagram of a tubular structure.

FIG. 11A is a cross-sectional diagram of a tubular structure LED TR comprised of alternating LEDs, LED R, LED Y and LED B. LED R, LED Y and LED B have internal means of collimation.

Figure 11B:
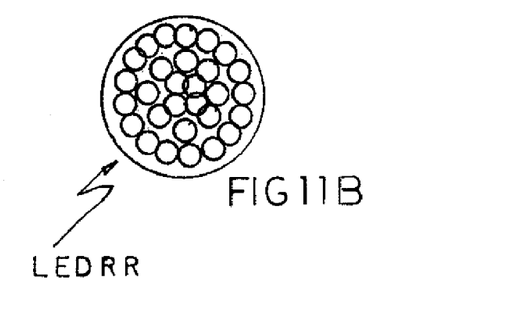
FIG. 11B is a cross-section view of a bundle of LEDs.

FIG. 11B is a cross-section of a bundle of LEDs filling the cross-section of a rod LED R.

FIG. 1B illustrates a similar optical configuration as in FIGS. 1 and 1A differing in that both ends of the optical transmission rods are fed by LEDs, LEDR, LEDY and LEDB.

Figure 6D:
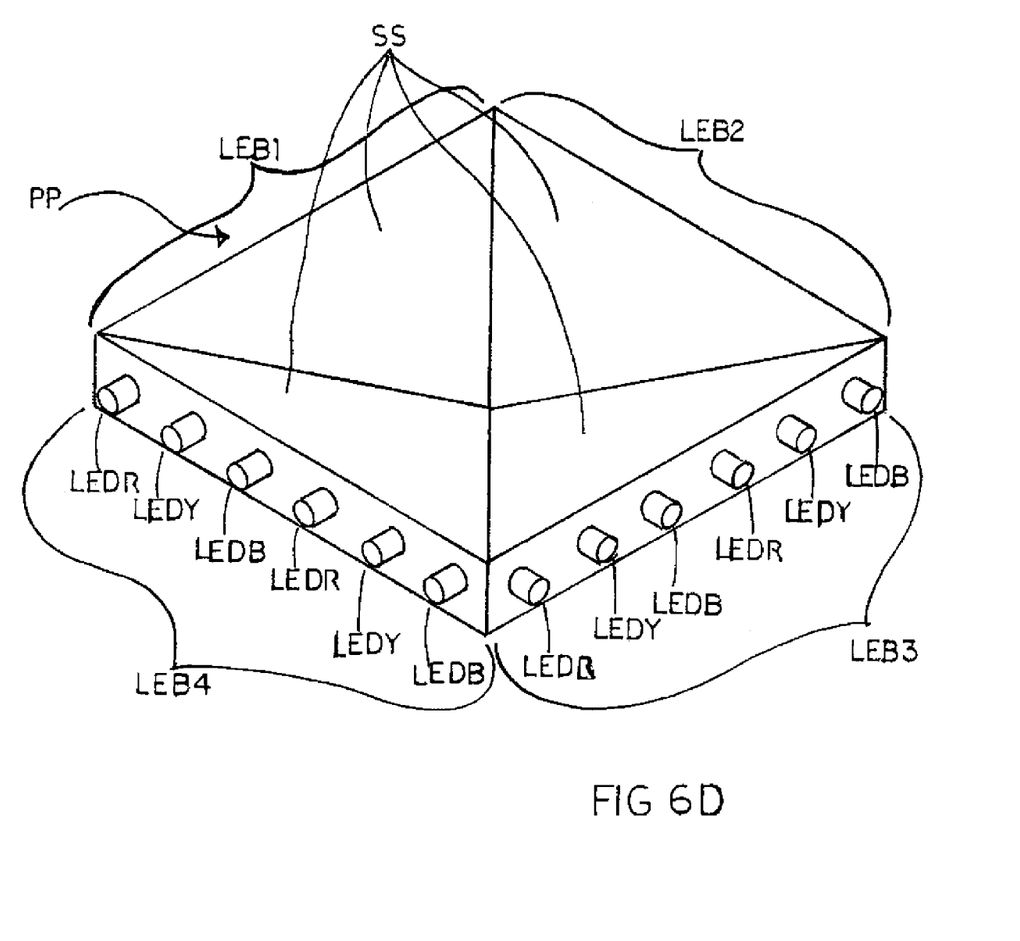
FIG. 6D is an isometric view.

FIG. 6D is an illuminating panel PL, which is substantially rectangular and is comprised of four sections SS, each having a tapered cross section SA, which is similar to those shown in FIGS. 2C, 2D, 2E, 2F and 2G. SS combine to form a single integrated plane surrounded by banks of LEDs LEB, LEB2, LEB3 and LEB4, the functions of mixing and refracting light from LEDs REDR, LEDY and LEDB are explained in connection with FIGS. 2C, 2D, 2E, 2F and 2G.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

The invention claimed is:

1. An illumination device for providing uniform light distribution and color mixing, comprising:
    a unified optical structure configured as a geometrical group of at least two tapered optical wedges disposed substantially as a planar configuration;
    each tapered optical wedge including an entry surface into which at least the light from at least one LED is projected; and
    each tapered wedge so disposed in relationship to at least one other tapered wedge to form a common interface through which light can pass from one said tapered wedge to another;
    said geometrical group being arranged so that said tapered optical wedges form a grid and their entry faces and tapers alternate in respect to their direction within the grid, said interface being formed at a crossing juncture of said tapered optical wedges.

2. An illumination device as in claim 1 wherein the entry face of at least one optical wedge comprises prisms.

3. An illumination system as in claim 1 wherein at least one tapered surface of at least one optical wedge comprises prisms.

4. An illumination device as in claim 1 wherein said at least one of said LEDs is at least partially surrounded by a collimating optic so as to project a collimated beam into the entry face of at least one optical wedge.

5. An illumination device as in claim 1 wherein at least one of said optical wedges is hollow.

6. An illumination device as in claim 1 wherein at least one of said optical wedges is solid.

7. An illumination device for providing uniform light distribution and color mixing comprising:
(a) a planar arrangement of at least two adjacent substantially conical shallow tapered optical wedges, each conical tapered wedge including a substantially conical reflective surface, a substantially planar surface in the shape of a polygon which is common to at least two of the conical tapered optical wedges, each conical optical wedge including at least three adjacent edges disposed along and defining the perimeter of the polygon at the narrow end of the conical tapered wedge, the thickness of the edges being equal to the dimension between the edge of the conical reflective surface and the edge of the planar surface, at least one edge of the conical optical wedge abutting and forming a common interface with the edge of an adjacent conical wedge along a side of the polygon shape; and
(b) at least one LED at least partially surrounded by a radial collimator optic located and disposed within a apex of each of the conical tapered wedges, projecting a radial beam outwardly through and within the wedges, a portion of the light passing through said edges of said wedges to mix with light emanating from the LED in an adjacent wedge.

8. An illumination device as in claim 7 wherein said at least one LED is surrounded by a collimating ring lens.

9. An illumination device as in claim 7 wherein the common interface of said wedges comprise prismatic elements.

10. An illumination device as in claim 7 wherein at least one of the conical optical wedges is solid including an entry face at the apex for light from the LED to enter.

11. An illumination device as in claim 10 wherein of the entry face of at least one of the tapered optical structures comprises prismatic elements.

12. An illumination device as in claim 10 wherein there are at least two different color LEDs projecting light into said entry face of at least one said conical optical wedges.

13. An illumination device as in claim 10 wherein multiple LEDS are disposed in a substantially ring like pattern projecting their associated beams outwardly into said conical optical wedge.

14. An illumination device as in claim 7 wherein at least one of the conical optical wedges is hollow.

15. An illumination device as in claim 7 wherein the bases of said shallow conical reflectors are in the shape of a regular polygon.

16. An illumination device as in claim 7 wherein said conical reflective surface is segmented into at least one flat tapered sides.

17. An illumination device as in claim 7 wherein there are at least four adjacent conical tapered wedges at least two edges of at least two at least wedges sharing a common interface with each other.

* * * * *